May 12, 1970 J. D. MILLER 3,511,222
PORTABLE STOVE
Filed Sept. 9, 1968
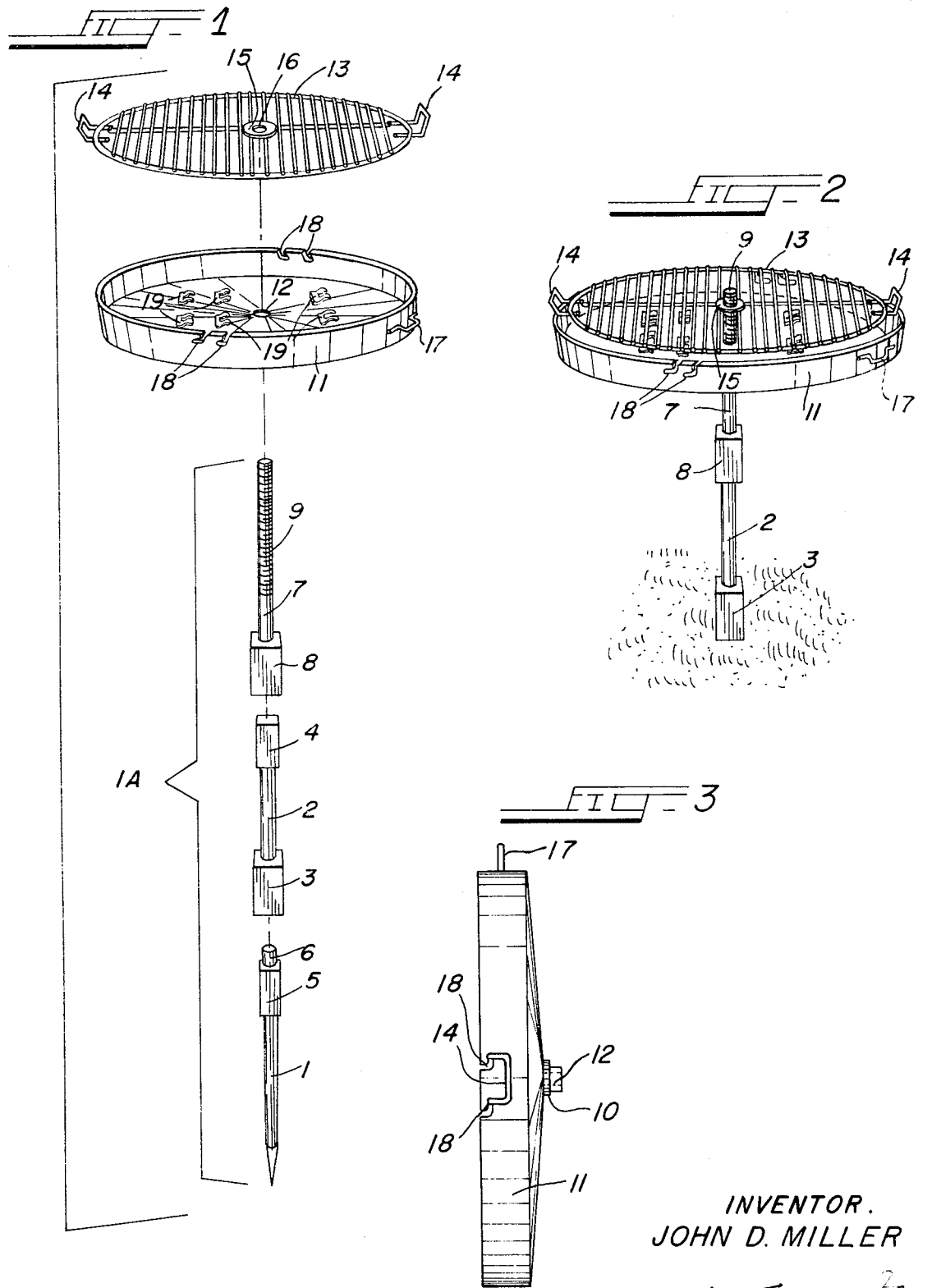
INVENTOR.
JOHN D. MILLER

United States Patent Office 3,511,222
Patented May 12, 1970

---

3,511,222
PORTABLE STOVE
John D. Miller, Fairfield, Iowa
(6635 Olive St., Commerce City, Colo. 80022)
Filed Sept. 9, 1968, Ser. No. 758,278
Int. Cl. F24c 1/16; F24b 3/00; F47j 37/07
U.S. Cl. 126—9                                    3 Claims

ABSTRACT OF THE DISCLOSURE

A portable stove having a support that is sectioned. The sectioned support being so comprised as to be driven into the ground, threaded to receive a base and a grill and storable in the base when unthreaded from the base and the grill. The base having notches therein to receive the grill for storing.

BACKGROUND OF THE INVENTION

Field of the invention

This invention pertains to portable stoves and more particularly to a type of stove commonly used with charcoal for cooking which is easily assembled and disassembled, adjustable and storable.

Description of the prior art

Heretofore portable charcoal burning stoves have been made so that they are not easily assembled or disassembled if they have an adjustable grill. The adjustments on most stationary stoves have been by a lever device which has been unsatisfactory. Most protable stoves have not had an adjustment for the grill height over the firebed.

SUMMARY OF THE INVENTION

The portable stove herein described provides an easily assembled and disassembled stove with a screw adjustment for the height of the base and the grill. The support for the stove is storable in the base when disassembled and the grill is also storable in the base.

It is, therefore, an object of this invention to provide a portable stove which is easily assembled and disassembled.

It is the further object of this invention to provide a portable stove which has a screw adjustment thereon for the height of the base, the grill and the relative height of the base and the grill.

It is a further object of this invention to provide a portable stove wherein the grill is easily turnable for adjustment of the height of the grill from the firebed without tilting.

Further objects and advantages of this invention will become apparent from the following drawings, descriptions and claims.

BRIEF DESCRIPTION OF THE DRAWINGS

FIG. 1 is an exploded isometric view of the several parts of the portable stove. FIG. 2 is an isometric view of the portable stove when assembled. FIG. 3 is a side view of the portable stove when disassembled and put together for carrying or storing.

DESCRIPTION OF THE PREFERRED EMBODIMENT

Referring now to the drawings the portable stove has a sectioned support 1A comprised of a stake 1, an intermediate section 2 and a top section 7. The stake is pointed at one end for driving into the ground. The intermediate section 2 has a receptacle 3 at its lower end and a squared portion 4 at its upper end. The receptacle 3 receives the squared portion 5 of the stake 1. It is to be noted that the stake 1 extends above the squared portion 5 having a portion 6 available for driving so as not to spoil the configuration of the squared portion 5. The top section 7 has a receptacle 8 to receive the squared portion 4 and has threads 9 at its upper end. A member 10 is secured to the center of the bottom of the base 11. The member 10 has internal threads 12 to receive the threads 9 on the top section 7 of the sectioned support 1A. A grill 13 having handles 14 thereon has a small piece 15 located at its center. The piece 15 has a threaded hole 16 therein which also receives the threads 9.

A handle 17 for carrying is attached to the base 11. Notches 18 in the base 11 receive the handle 14 of the grill 13 when the portable stove is disassembled and put together for carrying. Clamps 19 in the base 11 receive the sections 1, 2 and 7 of the sectioned support 1A.

In assembling and erecting the portable stove the stake 1 is driven into the ground by hitting the round portion 6. The intermediate section 2 is then placed on the stake 1 and the top section 7 is placed on the intermediate section 2. The base 11 is screwed onto the threads 9 to a desirable height leaving enough of the threads 9 protruding through the base 11 so that the grill 13 may be screwed onto the threads 9. The base 11 is filled with combustible material such as charcoal, and the fire may be lighted and the stove used for cooking. The relative height of the grill 13 over the fire in the base 11 may be changed by turning the grill 13 on the threads 9. After the stove has been used for cooking and is ready for storing, the grill 13 and the base 11 are unscrewed from the threads 9. The sectioned support 1A is then disassembled and inserted into the clamps 19 in the base 11. The grill then is reversed and the handles 14 inserted in the notches 18 and turned slightly so that they are secured therein. The handle 17 is then used for carrying.

The sectioned support 1A may be comprised of only two sections rather than the three sections as described. It may be also comprised of more than three sections depending upon the desired height required.

I claim:

1. A portable stove having a support comprised of several sections, one of the sections disposed so as to be driven into the ground, another section disposed so as to fit onto the section that is driven into the ground, threads located on the top section of the support, a base with a threaded opening in its center disposed so as to be screwed onto the threads located on the top section of the support, a grill having a piece in its center with a threaded opening therein disposed so as to be screwed onto the threads located on the top section of the support.

2. The portable stove of claim 1, the base having notches therein to receive handles on the grill for storing, the base also having clamps therein to receive the sections of the support for storing.

3. The portable stove of claim 2, the section of the support disposed so as to be driven into the ground having a squared portion near its top and a piece protruding above the squared portion of said section to protect said squared portion when being driven into the ground.

References Cited

UNITED STATES PATENTS

| 2,797,681 | 7/1957 | Crosley et al. | 126—9 X |
| 2,980,100 | 4/1961 | Bamberger | 126—25 |
| 3,094,113 | 6/1963 | Avila | 126—30 |
| 3,176,676 | 4/1965 | Caldwell. | |

CHARLES J. MYHRE, Primary Examiner

U.S. Cl. X.R.

126—25, 30